March 27, 1956  R. W. HAUTZENROEDER ET AL  2,739,731
VENTING MEANS FOR LIQUID STORAGE TANKS
Filed March 7, 1952

INVENTORS.
Richard W. Hautzenroeder,
Ray A. Brown.
BY Carlson, Pitzner, Hubbard & Wolfe
ATTORNEYS United States Patent Office 2,739,731
Patented Mar. 27, 1956

2,739,731

VENTING MEANS FOR LIQUID STORAGE TANKS

Richard W. Hautzenroeder, Detroit, and Ray A. Brown, Wayne, Mich., assignors to Harry Ferguson, Inc., Detroit, Mich., a corporation of Delaware Application March 7, 1952, Serial No. 275,394

4 Claims. (Cl. 220—44)

The invention relates to improvements in venting means for tanks, especially those intended to hold liquids that vaporize at relatively low temperatures such, for example, as the liquid fuels used for driving tractors and other automotive vehicles.

The conditions under which tractors and comparable automotive vehicles are used makes it imperative to provide adequate venting for the fuel tank. In the case of conventional tractors, for instance, it is usually found most convenient to mount the fuel tank over the motor. While the motor and tank are usually covered by a hood, nevertheless the tank is exposed to some radiant energy from the sun as well as a substantial amount of radiant heat from the motor. Furthermore, there is additional heating from the air stream blown over the motor by the cooling fan. As a result, during the operation of the tractor the fuel in the tank is heated to a comparatively high temperature and vaporization is thus greatly accelerated. This is particularly true when the liquid fuel is of the low boiling point type such as that used for automobile fuel. If this vapor is not allowed to escape freely from the tank, sufficient pressure may be generated therein to force an excessive amount of fuel into the carburetor, thus upsetting fuel-air mixing ratios or even flooding the carburetor.

The venting of tractor fuel tanks presents serious difficulties because of the turbulence of the liquid fuel in the tank during operation of the tractor. The tank being mounted closely adjacent the motor, is subjected to the high frequency vibrations of the motor and superimposed thereon are the low frequency vibrations of high amplitude due to the motion of the tractor over the ground. Such vibrations cause so much surging and splashing of the liquid fuel that, with conventional venting arrangements, a substantial quantity of the liquid may be splashed through the vent opening or carried therethrough by entrainment with the escaping vapors. The reduction in the velocity of the escaping vapor when it reaches the atmosphere allows such escaping liquid to be deposited on the tank and run down onto the motor. This creates a serious fire hazard in addition to wasting fuel.

With the above in view, it is one object of the invention to provide means for venting liquid fuel tanks of the above general character which completely eliminates the above mentioned difficulties.

A more specific object is to provide venting means which permits the vapor generated in the tank to escape freely therefrom and yet effectively prevents the escape of any liquid either through splashing or through entrainment with the vapor.

While the vent means may be built into the tank as a more or less fixed or permanent part thereof, it is preferred to incorporate it in a unit that is readily separable from the tank as, for example, in the closure or cap utilized for closing the filling or other opening in the tank. It is another object of the invention to provide a unit of that character which requires a minimum amount of space for its accommodation.

Still another object of the invention is to provide a tank venting unit or cap that is well adapted for mass production and capable of being manufactured at low cost.

Other objects and advantages of the invention will become apparent from the following detailed description of the preferred embodiment illustrated in the accompanying drawing, in which.

Figure 1:
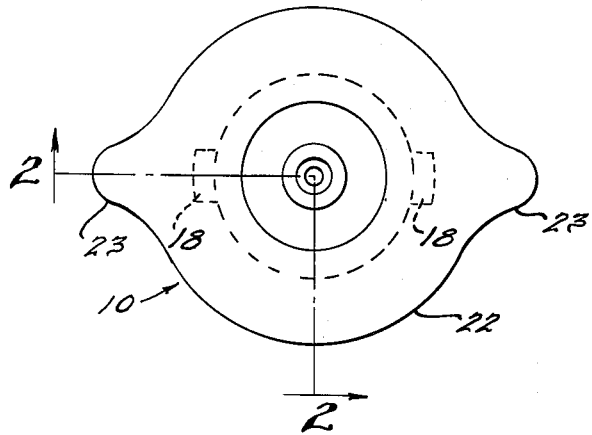
Fig. 1 is a top view of a fuel tank cap embodying the novel venting means of the present invention.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

For purposes of illustration the invention has been shown as incorporated in a closure unit or cap 10 for closing the filling opening 11 of a tractor fuel tank 12. The particular tank shown has an upstanding cylindrical neck 13 for the filler opening, the upper end of the neck being flanged inwardly and downwardly to provide an annular sealing seat 14 and locking cam surfaces 15 for the cap, as is the customary practice.

The cap 10, in its preferred form, comprises an inverted generally cup-shaped member 16 having a cylindrical side wall 17 from which are struck out radially projecting lugs 18 adapted to engage the cam surfaces 15 of the neck to lock the cap in place. Usually two of the lugs 18 are provided, that is one at each side of the cap and the seat flange 14 of the neck is slotted as at 19 to accommodate the lugs in the application and removal of the cap.

Figure 2:
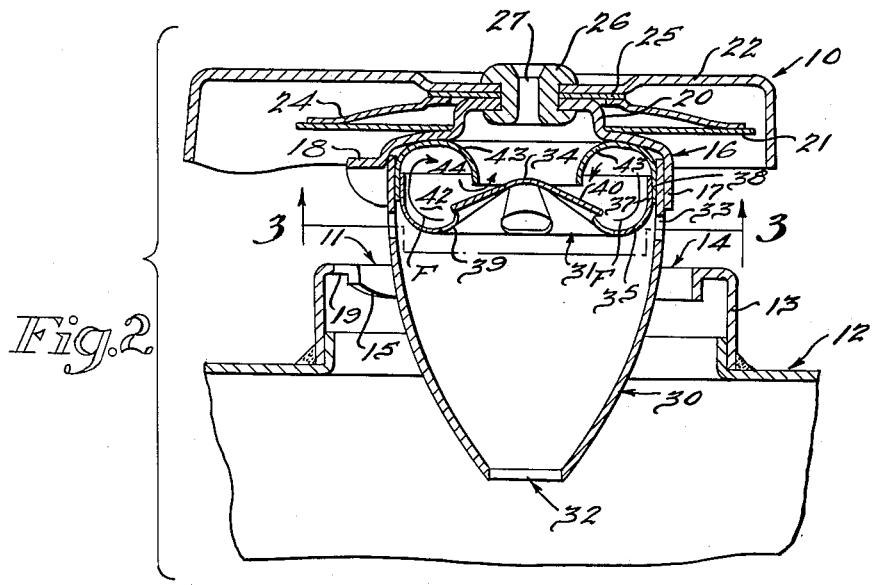
Fig. 2 is a sectional view taken in planes disposed at right angles to each other substantially on the line 2—2 of Fig. 1.

As shown in Fig. 2, the central portion of the member 16 is formed to present an upstanding generally cylindrical shoulder portion 20 of substantially smaller diameter than the wall portion 17 of the member. Upon this shouldered portion is mounted an annular gasket 21 of sufficiently large diameter to extend over and engage the sealing flange 14 of the filler neck when the cap is applied thereto. Mounted on the projecting central portion of the member 16 above the gasket is an operating member or shell 22 by which the cap may be turned to engage or disengage the locking lugs 18. The shell 22 is desirably shaped for convenient gripping in the hand, the exemplary form as shown in Fig. 1 having a generally circular central portion with radially projecting arms 23 at opposite sides.

Interposed between the gasket 21 and the shell 22 is a disc type spring 24 apertured centrally to accommodate the shouldered portion 20 of the member 16. The spring is generally concave or dished and is mounted so that its outer marginal edge portion bears against the upper surface of the gasket 21 while its inner marginal edge portion bears against a second gasket 25 seated against the inner face of the shell 22. The spring is thus effective to bias the gasket away from the shell and, when the cap is applied to the neck 13, to press the gasket into sealing engagement therewith and yet yield sufficiently to permit rotation of the cap between engaged and disengaged positions.

The member 20, gasket 25 and shell 22 are rigidly secured together by a rivet 26 inserted through aligned apertures in the respective elements. The rivet 26 may be tubular or may be suitably perforated to provide a central passage 27 which in this instance constitutes a vent hole for the escape of vapor from the tank 12.

In accordance with the invention, means is provided in conjunction with the above described portion of the cap 10 for preventing the escape of liquid through the vent opening 27 either through splashing or through entrainment with the escaping vapor without interference of the free venting of the vapor to the atmosphere. To this end, the cap is provided with a splash guard or shield 30 positioned to project into the tank below the vent opening, and within this shield is mounted a novel baffle unit 31. The shield and baffle unit are constructed and interrelated in a novel manner to enable them to trap and return to the tank any liquid splashed or otherwise carried toward the vent hole 27, and also to control the velocity of vapor flow to the vent hole so as to remove and return to the tank any liquid entrained in the vapor. In general, therefore, the elements of the cap structure provide for venting vapor from the tank in a substantially dry condition and at a uniform flow rate of relatively low velocity.

The shield 30 is preferably cup-shaped and of substantially greater length than its diameter. At its upper end the shield is dimensioned to fit within the side wall of the cup member 16 and the body portion thereof is tapered gradually toward its lower end. The shield and cup member may be rigidly secured together in any suitable manner, as by pressing the shield into the member.

At its lower end the shield 30 is formed with an opening 32 that is relatively large in area as compared to the vent hole 27. Additionally, a plurality of smaller openings 33 are formed in the upper portion of the wall somewhat below the portion overlapped by the wall portion 17 of the cap member 16. In the exemplary vent cap, the openings 33 are uniformly spaced apart circumferentially of the shield.

The baffle unit 31 is fitted into the upper end of the shield 30 and thus lies substantially within the cup member 16 when the elements are assembled. As herein shown, the baffle unit 31 comprises a lower baffle member 35 and an upper baffle member 36. These members may be in the form of dish-shaped stampings having generally cylindrical side walls 37 and 38 respectively dimensioned so that they may be assembled in interfitting telescoping relation.

Figure 3:
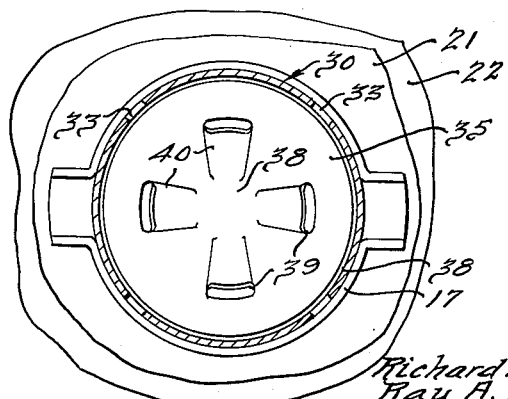
Fig. 3 is a transverse sectional view through the cap taken in a plane on the line 3—3 of Fig. 2.

As shown in Fig. 2 of the drawing, the bottom wall of the lower baffle member 35 joins the side wall 37 in a gently rounded curve, and the central portion of the bottom wall is formed upwardly into a generally conical boss 34. Around the lower edge of this boss are a series of holes 39, four in the present instance, spaced apart similarly to the openings 33 in the shield so that upon assembly of the parts the holes 39 will be positioned substantially midway between those openings as is shown in Fig. 3. Struck upwardly in the boss 34 and extending radially inwardly from each of the holes 39 is a ridge or rib 40 defining along its underside a passage for directing vapor flow through the hole 39.

The upper baffle member 36 is shaped to define with the lower baffle member a toroidal chamber 42. For this purpose the side wall 38 of the upper baffle member is merged into a top wall portion 43 of generally semicircular cross section, with its inner edge defining a relatively wide opening 44 centrally of the member. It will be observed that the position of the holes 39 with reference to the walls defining the chamber 42 is such that vapor particles entering through the holes 39 by way of the passages adjacent thereto are directed in a circular path as indicated by the arrows F in Fig. 2 of the drawing. As additional vapor is admitted to the chamber 42, some of this circulating vapor is forced out through the opening 44 and thence through the vent hole 27 which, in the present instance, is disposed immediately above the opening 44 and concentrically aligned therewith.

Having in mind the construction and arrangement of the shield and baffle assembly, the novel results obtained through the particular shape, dimensions, and relationship of the elements of that structure will be most readily appreciated upon consideration of the functioning of the device. Assume by way of example that the cap is applied to a tank 12 of the type shown, which constitutes the fuel tank of a conventional tractor. With the cap locked in place on the filling neck of the tank, the shield 30 will extend through the neck and project into the upper portion of the tank. Usually the lower end of the shield and the opening 32 therein will be spaced somewhat above the liquid level in the tank. It may be noted at this point that the relative sizes of the openings 32 and the vent hole 27 are not particularly critical. The vent hole must be large enough to allow the vapor to escape from the tank without building up objectionable pressure therein. At the same time, the size of the vent hole is subject to the space limitations imposed by its formation in the rivet 26. The opening 32 is substantially bigger than the vent hole, the primary consideration being that it is large enough to accommodate the vapor flow while allowing liquid caught in the shield and baffle structure to drain back into the tank.

The shield 30 is shaped to provide a progressively increasing inside area as a function of the distance above the opening 32. Accordingly, when liquid is splashed directly upwardly in the tank, a portion will enter through the opening 32 along with the vapor, but will be constrained to a progressively slower flow rate by reason of such increase in area at successively higher levels. The shape presented by the outer surface of the shield is also important in directing the splashing fuel away from the cap structure.

As is well understood by those skilled in the art, pressure waves are generated ahead of the liquid waves produced by the splashing of the liquid in the tank. The shield 30 acts in the present instance to equalize the pressure waves ahead of the liquid inside and outside the shield. This results from the admission to the upper portion of the shield through the openings 33 of similar pressure waves of vapor which act to cushion the effect of the pressure waves admitted through the opening 32. The net result is that a smooth, continuous flow of vapor is discharged through the holes 39 into the baffle unit.

It will be understood that liquid splashed into the shield 30, either through the opening 32 or the openings 33, will drain down the walls of the shield and return to the tank 12 through the opening 32. The vapor entering the shield escapes through the holes 39 into the chamber 42, and as explained heretofore, is given a circular motion by reason of the shape of the chamber and the position of the holes therein. The entire toroidal mass of vapor thus rotates continuously about the annular axis of the chamber 42, and appropriate amounts are bled out through the opening 44 as additional vapor enters through the holes 39. During this circulatory movement of the vapor, substantially all entrained liquid is deposited in the chamber 42 and drains back into the shield 30 through the holes 39.

The opening 44 in the upper baffle member is relatively large as compared to the aggregate area of the holes 39, and consequently the velocity of the escaping vapor is reduced substantially. The tendency of the vapor to carry entrained liquid is thus further reduced so that the vapor discharged through the vent hole 27 is practically free of liquid. By reason of the pressure equalizing action afforded by the shield and the baffle structure, the vapor is discharged through the vent hole 27 in a smooth, substantially continuous stream.

The cap structure by which the foregoing new and useful results are obtained is characterized by its simplicity and its adaptation to low cost mass production. The various elements of the structure, with the exception of the gaskets and the disc spring 24, can be produced inexpensively from sheet metal by simple forming and stamping operations. The baffle members may be assembled by simply pressing them together and the shield 30 may be assembled with the cup member of the cap by pressing it into the cap. Thus low initial cost is attained without sacrifice of either durability or efficiency.

We claim as our invention:

1. Vent means for tanks adapted to hold liquids vaporizing at relatively low temperatures and having a filling opening, said vent means comprising a member adapted to be locked in closing relation to the tank opening and having a vent hole for the escape of vapor generated in the tank, means for preventing the escape of liquid through said vent hole including a cup-shaped shield secured to said member and depending therefrom into the tank, said shield having an inlet opening at its lower end remote from the member for admitting vapor thereto and increasing progressively in cross-sectional area from said inlet opening whereby to effect a reduction in the velocity of the vapor in its passage toward the vent hole, and a baffle unit extending transversely across said shield adjacent its upper end, said baffle unit having a series of inlet holes facing the inlet opening in the shield and an outlet from said baffle unit facing and substantially axially alined with said vent hole, portions of said unit adjacent said openings being struck upwardly to define channels for directing the vapor flow through said holes generally transversely of the flow from the inlet opening and away from said outlet, the portion of the baffle outwardly of said inlet holes being shaped to direct the flow in a generally circular path to said outlet.

2. A vent cap for a tractor fuel tank having a filling opening comprising, in combination, an inverted cup-shaped member adapted to be locked in the filling opening of the tank, a spring biased gasket secured to said member and operative to seal the tank opening when the member is locked therein, said member having a vent hole permitting the escape of vaporized fuel from the tank to the atmosphere, a shield secured to said member and extending into the tank, said shield having an inlet for the passage of vapor and being shaped so as to substantially prevent the liquid fuel in the tank from splashing through said vent hole, a baffle unit mounted in said shield adjacent said member, said baffle unit including a first member dividing said shield into lower and upper chambers and a second member overlying said first member and with it defining a toroidal chamber, a plurality of inlet openings in that portion of said first member defining the lower inner side of said toroidal chamber and communicating with the lower of said chambers, and said second member having its inner edge spaced from said first member to define an annular outlet opening from said toroidal chamber communicating with the upper of said chambers, the outlet opening of said unit being substantially larger in effective area than the combined effective areas of the inlet openings whereby to reduce the velocity of the vapor entering said upper chamber.

3. In a vent cap for liquid fuel tanks, a baffle unit comprising upper and lower members having cylindrical side walls respectively dimensioned for interfitting telescoping engagement, said lower member having a bottom wall formed with a central upwardly projecting generally conical boss, said upper member having an annular top wall generally semi-circular in cross section cooperating with the side and bottom walls of the lower member to define a toroidal vapor circulating chamber, said lower member having a series of openings in its conical boss below the top thereof for admitting vapor to said chamber and the top wall of said upper member having a central opening with its marginal edge extending below the top of said boss and cooperating therewith to define an annular outlet for the escape of vapor from the chamber.

4. In a vent cap for liquid fuel tanks, a baffle unit comprising upper and lower members having cylindrical side walls respectively dimensioned for interfitting telescoping engagement, said lower member having a bottom wall formed with a central upwardly projecting generally conical boss, said upper member having an annular top wall generally semi-circular in cross section cooperating with the side and bottom walls of the lower member to define a toroidal vapor circulating chamber, said lower member having a series of openings in its bottom wall adjacent the base of said boss for admitting vapor to said chamber, and a series of upwardly projecting ridges formed in said boss in alignment with said openings defining channels for directing vapor flow into and across the bottom of the chamber in a direction effective to promote circular flow of the vapor in the chamber.

References Cited in the file of this patent

UNITED STATES PATENTS

| 22,887 | Peaslee | Feb. 8, 1859 |
| 910,169 | Brand | Jan. 19, 1909 |
| 1,791,668 | Fox et al. | Feb. 10, 1931 |
| 2,150,859 | Gibson et al. | Mar. 14, 1939 |
| 2,154,113 | Smith | Apr. 11, 1939 |
| 2,504,072 | Friend et al. | Apr. 11, 1950 |

FOREIGN PATENTS

| 281,391 | Italy | Jan. 12, 1931 |
| 344,296 | Italy | Nov. 3, 1936 |